United States Patent
Mao et al.

(10) Patent No.: US 6,198,177 B1
(45) Date of Patent: Mar. 6, 2001

(54) POWER SUPPLY PROVIDING BACKUP AC VOLTAGE AND METHOD OF OPERATION THEREOF

(75) Inventors: Hengchun Mao; Vijayan J. Thottuvelil, both of Plano, TX (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/479,514

(22) Filed: Jan. 7, 2000

(51) Int. Cl.$^7$ .................................................... H02J 7/00
(52) U.S. Cl. ............................................. 307/66; 307/64
(58) Field of Search ............................................. 307/66, 64

(56) References Cited

U.S. PATENT DOCUMENTS

| | | | |
|---|---|---|---|
| 4,473,756 | * 9/1984 | Brigden et al. | 307/66 |
| 4,719,550 | 1/1988 | Powell et al. | 363/37 |
| 5,465,011 | 11/1995 | Miller et al. | 307/64 |
| 5,610,451 | 3/1997 | Symonds | 307/66 |
| 5,610,805 | 3/1997 | Gupta | 363/37 |
| 5,856,712 | 1/1999 | Suzuki et al. | 307/64 |
| 5,978,236 | 11/1999 | Faberman et al. | 363/37 |
| 5,982,645 | * 11/1999 | Levran et al. | 363/37 |
| 6,115,276 | * 9/2000 | Mao | 363/127 |

OTHER PUBLICATIONS

Fitzgerald and Higginbotham, Leakage Reactance, McGraw–Hill Text Second Edition, Basic Electrical Engineering, pp. 198–199, Jan. 1957.*

* cited by examiner

Primary Examiner—Albert W. Paladini
Assistant Examiner—Robert L DeBeradinis

(57) ABSTRACT

A power supply that provides a source of backup AC voltage and a method of operating thereof. In one embodiment, the power supply includes a transformer having main power and backup power windings and a secondary winding. The power supply also includes multiple stages, namely, (1) a primary power stage coupled to the main power winding, (2) a backup power stage coupled to the backup power winding and having a backup battery, one of the primary and backup power stages acting as a current fed source and (3) an AC power stage, coupled to the secondary winding, that provides a source of AC voltage. The power supply is operable in a normal mode of operation in which the primary power stage supplies power to the secondary winding and further supplies power to the backup power winding to allow the backup power stage to charge the backup battery. The power supply is also operable in a backup mode of operation in which the backup power stage transfers power from the backup battery to the secondary winding via the backup power winding.

18 Claims, 3 Drawing Sheets

POWER SUPPLY PROVIDING BACKUP AC VOLTAGE AND METHOD OF OPERATION THEREOF

CROSS-REFERENCE TO RELATED APPLICATION

This application is related to U.S. patent application Ser. No. 09/198,918 now U.S. Pat. No. 6,115,276, entitled "SYSTEM AND METHOD FOR PROVIDING BATTERY BACKUP POWER," filed on Nov. 24, 1998, commonly assigned with the present application and incorporated herein by reference.

TECHNICAL FIELD OF THE INVENTION

The present invention is directed, in general, to power conversion and, more specifically, to a power supply having backup power capability and providing a source of backup AC voltage.

BACKGROUND OF THE INVENTION

The reliability of telecommunication systems that users have come to expect and depend on is based, in part, on the systems' reliance on redundant equipment and power supplies. Telecommunication switching systems, for example, route tens of thousands of calls per second. The failure of such systems, due to, for instance, the loss of incoming AC power, may result in a loss of millions of telephone calls and a corresponding loss of revenue.

Power plants, such as battery plants, attempt to alleviate the power loss problem by providing the telecommunication system with a backup power supply for use in the event that the incoming source AC power is interrupted. Since the backup power supply is often called upon to provide power to the load for durations longer than just a few seconds, the implementation of a battery backup system has a significant impact on both the performance and the cost of the power plant.

Traditionally, the telecommunications systems are located in a central office environment wherein large-capacity power plants provide an energy reserve adequate to power the systems for as much as a few days. A power plant based on a DC-bus architecture, for instance, usually contains several rectifiers that process the incoming AC power and produce DC power that is then applied to a DC battery bus. The power plant also includes a plurality of batteries coupled to the DC battery bus, that provide an energy reserve in the event the incoming AC power is interrupted. The energy reserve of the DC battery bus then provides power to a number of isolated DC-DC converters (e.g., board mounted power supplies) that convert the DC power from the bus voltage level to a voltage level suitable for the load.

The rectifier generally includes a power factor correction circuit that processes the incoming AC power and produces therefrom high voltage DC power. The rectifier further includes an inverter that generates high frequency AC power from the high voltage DC power, for transmission across an isolation transformer. A rectifier and filter circuit of the rectifier then converts the high frequency AC power into DC power suitable for coupling to the DC battery bus. During a normal mode of operation, the DC power provided to the DC battery bus by the rectifier is used to power the loads and to charge the batteries.

The DC-DC converters generally include an input filter circuit and an inverting circuit that produce high frequency AC power from is the DC power on the DC battery bus for transmission across an isolation transformer. A rectifier and filter circuit of the converter then rectifies the high frequency AC power to produce DC power that powers the load.

Power plants employing the above described DC-bus architecture provide several advantages including relatively high system availability and good decoupling between the various units of load equipment. Inasmuch as the rectifiers and DC-DC converters are coupled to the DC battery bus, however, the architecture requires many components and power conversion stages and is thus inefficient, bulky and expensive.

The aforementioned architectures are directed to delivering DC power to a load. Some telecommunications systems require an AC voltage signal to operate portions of the system equipment, such as ringer circuits or to operate AC powered loads such as air conditioning equipment or computer displays. Another example is a backed-up power system that can be used to power both a wireless base station via a DC output and a hybrid fiber coaxial network via an AC output. In the case of AC powered circuits, the required AC power has very specific voltage magnitude and frequency specifications that are dictated by the equipment. This condition necessitates being able to provide both the required AC and DC power to the system under all conditions including a backup operating condition when the main source of AC input power is not available.

A particular concern is managing the transition from a normal or primary operating mode to a mode requiring the use of a backup power system. A control circuit that is used to manage such a transition is required to detect when there is an absence of a primary source voltage in a primary power system and switch to a backup power system. Typically, the primary power system and the backup power system are voltage sources having a low output impedance. Since the outputs of low output impedance voltage sources cannot generally be directly coupled together without causing serious circulating current problems with probable component damage, the transition must be orchestrated carefully. This requirement typically increases the complexity and therefore the cost of such control systems.

Accordingly, what is needed in the art is a power supply having backup power capability providing an AC output voltage that simplifies the transition between operating modes.

SUMMARY OF THE INVENTION

To address the above-discussed deficiencies of the prior art, the present invention provides a power supply that provides a battery backed-up source of AC voltage and a method of operation thereof. In one embodiment, the power supply includes a transformer having main power and backup power windings and a secondary winding. The power supply also includes multiple stages, namely, (1) a primary power stage coupled to the main power winding, (2) a backup power stage coupled to the backup power winding and having a backup battery, one of the primary and backup power stages acting as a current fed source and (3) an AC power stage, coupled to the secondary winding, that provides a source of AC voltage.

In one embodiment of the present invention, the power supply is operable in a normal mode of operation in which the primary power stage supplies power to the secondary winding and further supplies power to the backup power winding to allow the backup power stage to charge the backup battery. The power supply is also operable in a backup mode of operation in which the backup power stage transfers power from the backup battery to the secondary winding via the backup power winding.

The present invention introduces, in one aspect, the broad concept of employing a single power supply employing a current fed source and having backup power capability to provide an AC voltage to power an AC load. The power supply, in one embodiment, provides primary power and backup power via a transformer to the AC power stage. The power supply allows seamless switching from a primary source of power to the backup source, if necessary.

In one embodiment of the present invention, the primary power stage of the power supply includes a primary switching network. The primary switching network may include a half bridge input having a half-wave switching configuration which alternately connects one side of the main power winding of the transformer to each of two input busses. Alternatively, the primary switching network may include a full bridge input having a full-wave switching configuration which alternately connects the main power winding of the transformer to the input bus. In a related embodiment, the primary power stage includes at least one input capacitor. Of course, other switching arrangements and components may be employed in the primary power stage and still be within the broad scope of the present invention.

In one embodiment of the present invention, the backup power stage of the power supply includes a battery charger/inverter that coordinates the battery usage. In the normal mode of operation, the battery charger/inverter maintains the battery at a fully charged state with power being supplied to the battery from the primary power stage through the backup power winding of the transformer, if necessary. In the backup mode of operation, the battery charger/inverter directs power from the battery through the backup power winding of the transformer to the output loads of the power supply. In an alternate embodiment, the backup power stage includes an inductor.

In one embodiment of the present invention, the transformer has a second secondary winding coupled to a DC power stage that provides a source of DC voltage. The DC power stage includes a rectifier that supplies the DC voltage. In a related embodiment, the DC power stage includes a DC output switching network. The rectifier may operate on a half-wave rectification principle to provide the DC voltage to the DC output switching network. Of course, other DC output switching networks may be employed as design and load requirements dictate.

In one embodiment of the present invention, the AC power stage includes an AC output switching network that provides the source of AC voltage. Any AC output switching network may be employed to advantage. Additionally, the AC power stage may supply an output frequency in a range of about 50 to 60 hertz. Of course, other output frequencies may be employed as requirements dictate.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art will appreciate that they can readily use the disclosed conception and specific embodiment as a basis for designing or modifying other structures for carrying out the same purposes of the present invention. Those skilled in the art will also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1A:
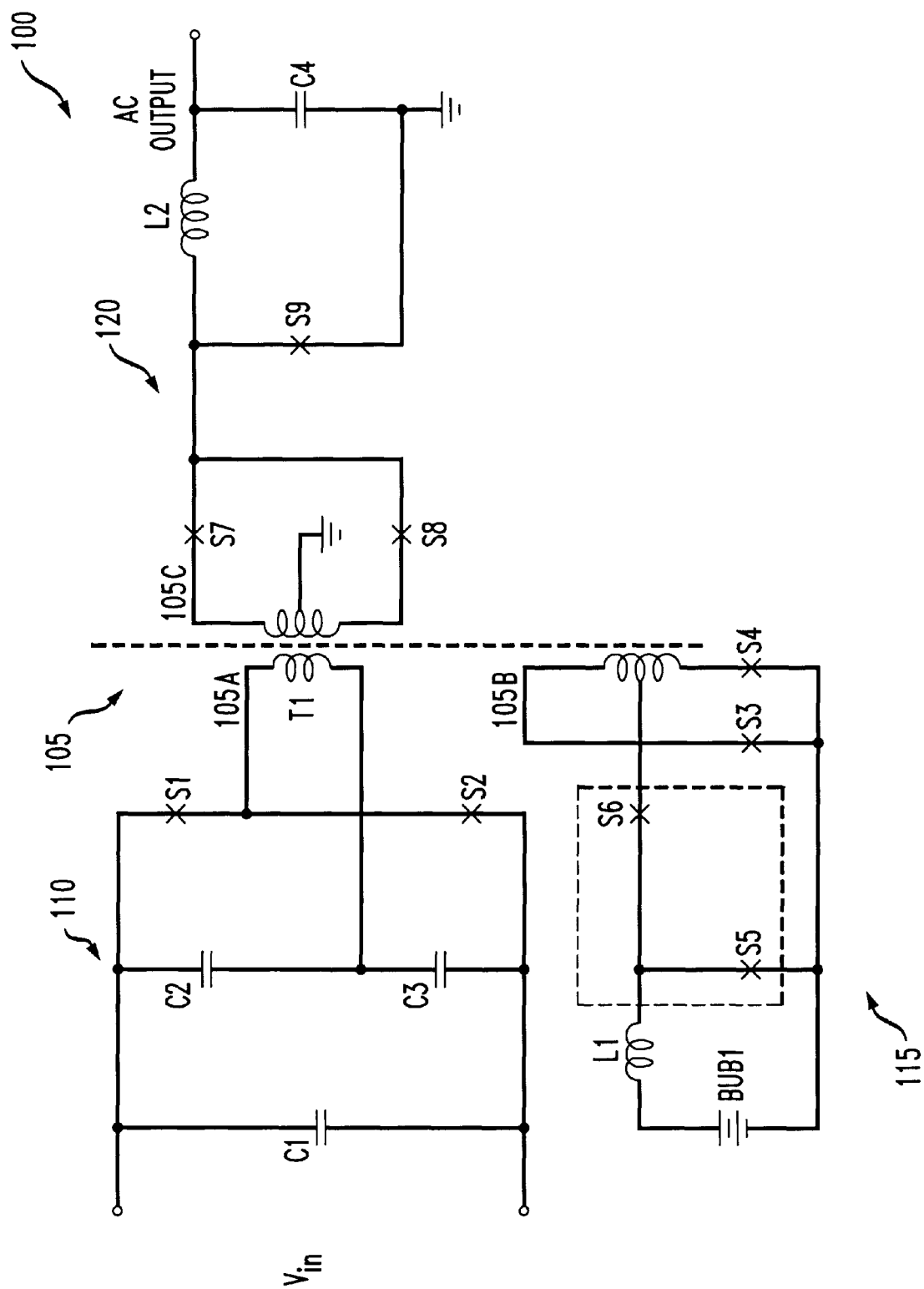
FIG. 1A illustrates a schematic diagram of an embodiment of a power supply constructed according to the principles of the present invention.

Referring initially to FIG. 1A, illustrated is a schematic diagram of an embodiment of a power supply 100 constructed according to the principles of the present invention. The power supply 100, connected to an input voltage Vin, includes a transformer 105, a primary power stage 110, a backup power stage 115, and an AC power stage 120. The transformer 105 further includes a main power winding 105A coupled to the primary power stage 110, a backup power winding 105B coupled to the backup power stage 115, and a secondary winding 105C coupled to the AC power stage 120.

The primary power stage 110 includes first, second and third capacitors C1, C2, C3 and first and second switches S1, S2. The backup power stage 115 includes a first inductor L1, third, fourth, fifth and sixth switches S3, S4, S5, S6 and a backup battery BUB1. The AC power stage 120, which provides an AC output voltage, includes a center-tapped arrangement consisting of seventh and eighth switches S7, S8, a ninth switch S9, a second inductor L2 and a fourth capacitor C4. The seventh, eighth, and ninth switches S7, S8, S9, of the AC power stage 120 are bi-directional to accommodate the AC voltage requirements.

The power supply 100 is used in power conversion and possesses backup power capability for providing AC power to a load. In this embodiment, the power supply 100 is operable in a normal mode of operation in which the primary power stage 110 supplies power to the secondary winding 105C and thereby power to the output load. The primary power stage 110 further supplies power to the backup power winding 105B to allow the backup power stage 115 to charge the backup battery BUB1. Alternately, the power supply 100 may be operated in a backup mode of operation in which the backup power stage 115 transfers power from the backup battery BUB1 to the secondary winding 105C via the backup power winding 105B. The configuration of the power supply 100 allows the backup battery BUB1 to provide a single source of backup power to any and all loads powered therefrom.

Operation of the power supply 100 switches from the normal mode to the backup mode when a control circuit (not shown) senses an absence of the input voltage Vin. In the illustrated embodiment, the backup power stage 115 acts as a current fed source to the backup power winding 105B during the backup mode of operation. A current fed source demonstrates the characteristic of providing a high output impedance while delivering a current that changes relatively slowly as compared to a constant current source, which exhibits essentially no change in current. Alternately, a voltage fed source, such as the primary power stage 110, provides a low output impedance to the main power winding 105A. A voltage fed source demonstrates the characteristic of providing a low output impedance that has the ability to deliver a current that may change its value quickly. Of course, the primary power stage 110 may be a current fed source and the backup power stage 115 may be a voltage fed source.

The backup power stage 115, when operating in the backup mode, uses the first inductor L1 to act as the current fed source. Those skilled in the pertinent art are familiar with the practice of employing an inductor to convert a voltage fed input into a current fed input. The high output impedance greatly facilitates switching from the normal to the backup mode of operation (or vice versa) as compared to switching between two sources acting as voltage fed sources. Having the high impedance characteristic of the current fed source provides an inherently graceful transition between operating modes by avoiding the possibility of connecting two voltage fed sources together through the transformer 105. Additionally, the use of a current fed source allows the control circuit (managing the transition between the operating modes) to be relatively simple as compared to switching between two voltage fed sources, thereby reducing overall complexity and cost.

In the illustrated embodiment, the primary power stage 110 includes a primary switching network consisting of the second and third capacitors C2, C3 and the first and second switches S1, S2. The primary switching network is configured as a half-bridge switching structure which alternately connects the main power winding 105A of the transformer 105 to each of two input busses, which are formed across the second and third capacitors C2, C3. The duty cycle associated with the first and second switches S1, S2 of the primary switching network is nominally 50 percent. In an alternate embodiment to be illustrated and described with respect to FIG. 2, a full-bridge switching structure alternately connects the main power winding 105A to the input voltage Vin. Of course, other switching structures and modes of operation are well within the broad scope of the present invention.

In the backup power stage 115, a battery charger/inverter consisting of the fifth and sixth switches S5, S6 coordinates the usage of the backup battery BUB1. In the normal mode of operation, the battery charger/inverter maintains the backup battery BUB1 in a fully charged state with power being supplied to the backup battery BUB1 from the primary power stage 110 through the backup power winding 105B. The battery charger/inverter typically operates with fifth and sixth switches S5, S6 and the first inductor L1 (functioning as a buck stage) to charge the backup battery BUB1. Third and fourth switches S3, S4 alternately connect the back-up power winding 105B to the input of the buck stage.

In the backup mode of operation, the battery charger/inverter directs power from the backup battery BUB1 through the backup power winding 105B to the output load of the power supply 100. In this mode, the battery charger/inverter typically operates as a boost stage employing the fifth and sixth switches S5, S6 and the first inductor L1. The third and fourth switches S3, S4 alternately connect the output of the boost converter to the back-up power winding 105B. Again, other configurations and modes of operation are well within the broad scope of the present invention.

The AC power stage 120 includes an AC output full-wave arrangement consisting of the seventh, eighth and ninth switches S7, S8, S9. This switching network, consisting of the seventh, eighth and ninth switches S7, S8, S9, the second inductor L2 and the fourth capacitor C4 provides an AC output voltage with an output frequency in a range of about 50 to 60 hertz. Of course other output frequencies may be employed as requirements dictate.

Figure 1B:
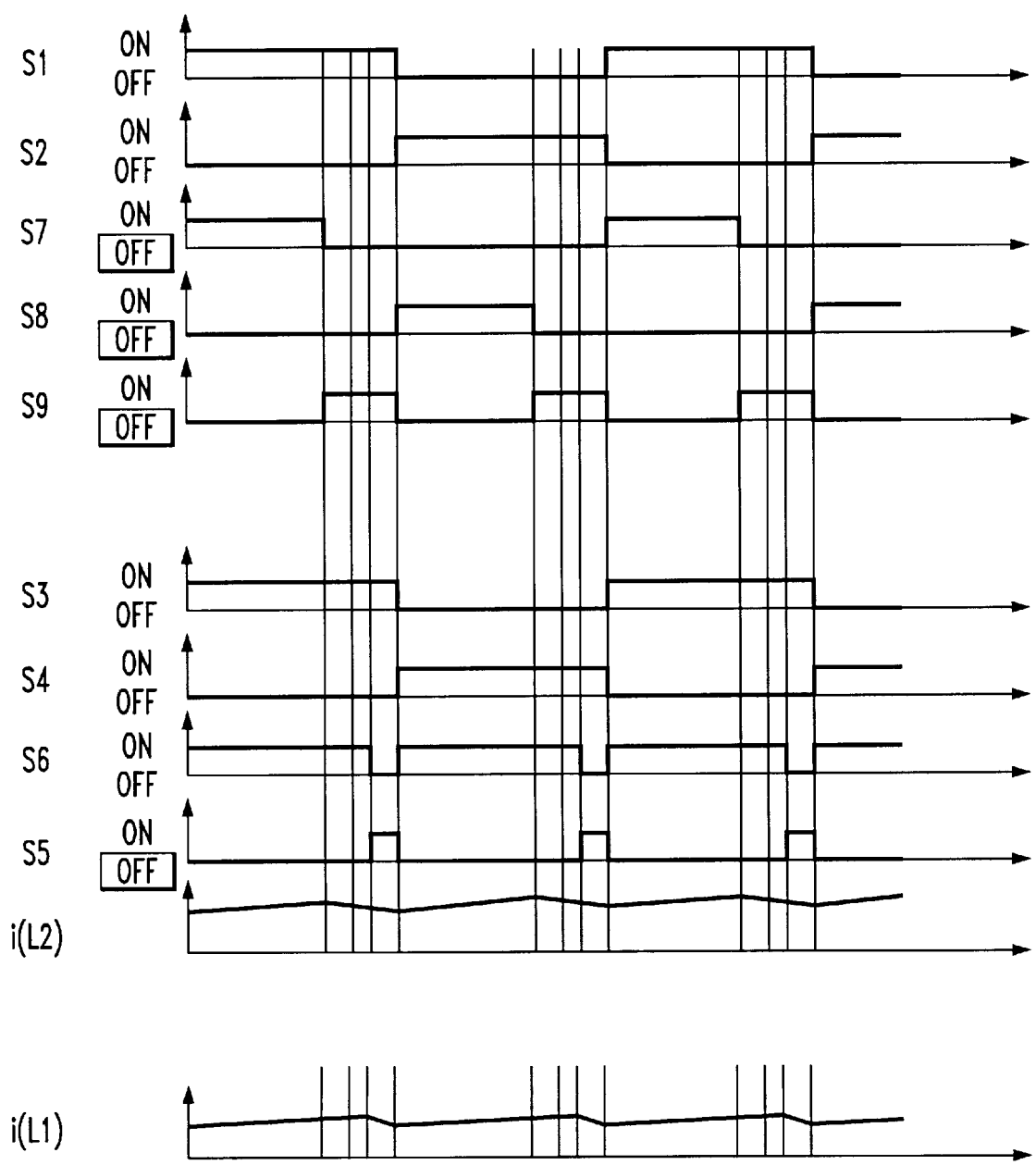
FIG. 1B illustrates a timing diagram depicting the operation of the power supply shown in FIG. 1A.

Turning now to FIG. 1B, illustrated is a timing diagram depicting the operation of the power supply 100 shown in FIG. 1A. The timing diagram shows the timing associated with the switches S1–S9 being in a condition of either ON (closed) or OFF (open) for the power supply 100 to function. Additionally, the timing diagram also shows inductor currents iL1 and iL2 through the first and second inductors L1, L2 respectively. The first and third switches S1, S3 as well as the second and fourth switches S2, S4 are seen to be ON and OFF simultaneously and to have a duty cycle of about 50 percent. This action directs power from the primary power stage 110 through the transformer winding 105B to the backup power stage 115 in a normal operating mode.

Further action of the fifth and sixth switches S5, S6 allows the backup battery BUB1 to remain in a fully charged state. The inductor current iL1 through the first inductor L1 is seen to increase when the sixth switch S6 is ON and the fifth switch S5 is OFF. Then, the inductor current iL1 through the first inductor L1 is seen to decrease when the fifth switch S5 is ON and the sixth switch S6 is OFF. The fifth and sixth switches S5, S6 assume the role of maintaining a fully charged state for the backup battery BUB1.

In the normal operating mode, power is further directed from the primary power stage 110 through the transformer winding 105C to the AC power stage 120. The seventh and eighth switches S7, S8 direct a portion of the power occurring at the output of the primary power stage 110 to the AC output switching network portion of the AC power stage 120. An output frequency of 50 to 60 hertz is achieved as a modulation on the much higher frequency (50 to 100 kilohertz) occurring in the waveforms shown in the timing diagram. The AC output switching network operates in CCM as well, since the inductor current iL2 through the second inductor L2 is continuous.

The normal mode of operation has been described where power is supplied through the primary power stage 110. For the condition where the primary power stage 110 cannot deliver the required power, the backup mode of operation uses the backup power stage 115 to deliver the power needed. In the backup mode, the waveforms in the timing diagram look much the same as shown but the fifth switch S5 assumes a dominant role in controlling delivery of the power needed from the backup battery BUB1. In the backup mode of operation, the backup power stage 115 acts like a current fed source whose operation is discussed in FIG. 1A above.

Figure 2:
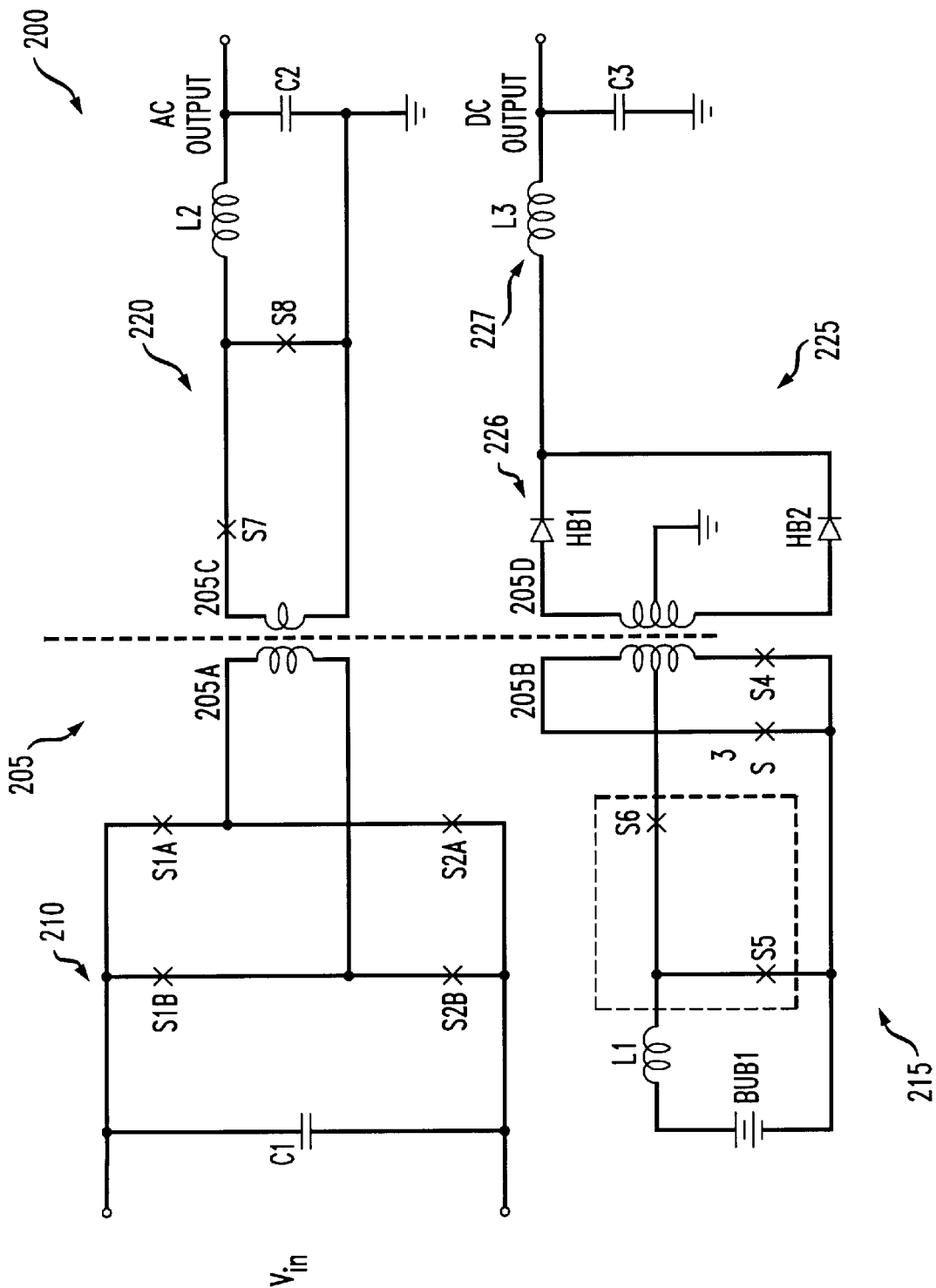
FIG. 2 illustrates a schematic diagram of another embodiment of a power supply constructed according to the principles of the present invention.

Turning now to FIG. 2, illustrated is a schematic diagram of another embodiment of a power supply 200 constructed according to the principles of the present invention. The power supply 200, connected to an input voltage Vin, includes a transformer 205, a primary power stage 210, a backup power stage 215, an AC power stage 220 and a DC power stage 225. The transformer 205 further includes a main power winding 205A coupled to the primary power stage 210, a backup power winding 205B coupled to the backup power stage 215, a first secondary winding 205C coupled to the AC power stage 220 and a second secondary winding 205D coupled to the DC power stage 225.

The primary power stage 210, which is another embodiment of a voltage fed source, includes a first capacitor C1 along with a first pair of switches (upper right switch S1A, upper left switch S1B) and a second pair of switches (lower right switch S2A, lower left switch S2B) coupled to the transformer winding 205A. The backup power stage 215, which is arranged to provide a current fed source, includes a first inductor L1, third, fourth, fifth and sixth switches S3, S4, S5, S6 and a backup battery BUB1. The AC power stage 220, which provides an AC output voltage, includes a seventh switch S7 coupled to the first secondary winding 205C, an eighth switch S8, a second inductor L2 and a second capacitor C2. The seventh and eighth switches S7, S8 are bi-directional to accommodate the AC voltage requirements.

In the illustrated embodiment, the DC power stage 225 provides a DC output voltage and includes a half-bridge rectifier 226 having first and second diodes HB1, HB2. The DC power stage 225 further includes a filter network 227 consisting of a third inductor L3 and a third capacitor C3. The first and second diodes HB1, HB2 provide a DC voltage to the filter network 227. Of course, other rectifier configurations and filter networks may be employed as design and load requirements dictate.

In the primary power stage 205, the upper right switch S1A and the lower left switch S2B are closed together, with the upper left switch S1B and the lower right switch S2A being open. Alternately, the upper left switch S1B and the lower right switch S2A are closed together, with upper right switch S1A and the lower left switch S2B being open. This complimentary switching pattern provides a fullwave switching structure, which alternately connects the main power winding 205A to the input voltage Vin. The duty cycle associated with the first and second pairs of switches S1A, S1B, S2A, S2B is nominally 50 percent. Again, other switching structures and modes of operation are well within the broad scope of the present invention.

For the DC power stage 125, power is directed either from the primary power stage 210, during a normal mode of operation, or from the backup power stage 215, during a backup mode of operation, through the transformer winding 205D. The half-bridge rectifier 226, consisting of the first and second diodes HB1, HB2, creates an output rectified DC voltage. The DC output filter network 227 operates in a continuous conduction mode (CCM), since the inductor current iL3 is continuous through the third inductor L3. Of course, a discontinuous conduction mode (DCM) of operation may also be accommodated in an alternate embodiment. Operation of the backup power stage 215 and the AC power stage 220 is analogous to those of FIG. 1 and will not further described.

Those skilled in the art should understand that the previously described embodiments of the power supply and related method are submitted for illustrative purposes only and other embodiments are well within the broad scope of the present invention. Additionally, exemplary embodiments of the present invention have been illustrated with reference to specific electronic components. Those skilled in the art are aware, however, that components may be substituted (not necessarily with components of the same type) to create desired conditions or accomplish desired results. For instance, multiple components may be substituted for a single component and vice-versa. The principles of the present invention may be applied to a wide variety of power circuit topologies.

For a better understanding of power electronics including power supplies and conversion technologies, see "Principles of Power Electronics," by J. G. Kassakian, M. F. Schlecht and G. C. Verghese, Addison-Wesley (1991). For a better understanding of power supply architectures, see "Powering Architectures for New Needs in Telecommunications," by D. Jugan, J. P. Leblanc and D. Marquet, Intelec '95 (1995) and "New Power Supply Structure for Telecom Equipments Toward a Unique Level of Conversion," by Didier Marquet and Jacques Girard, Intelec '91 (1991). The aforementioned references are incorporated herein by reference.

Although the present invention has been described in detail, those skilled in the art should understand that they can make various changes, substitutions and alterations herein without departing from the spirit and scope of the invention in its broadest form.

What is claimed is:

1. A power supply, comprising:
    a transformer having a main power winding with a first leakage inductance, a backup power winding with a second leakage inductance, and a secondary winding;
    a primary power stage coupled to said main power winding;
    a backup power stage coupled to said backup power winding and having a backup battery, one of said primary and backup power stages acting as a current fed source and including an inductor with an inductance greater than one of said first or second leakage inductances to which said current fed source is coupled; and
    an AC power stage, coupled to said secondary winding, that provides a source of AC voltage, said power supply operable in:
        a normal mode of operation in which said primary power stage supplies power to said secondary winding and further supplies power to said backup power winding to allow said backup power stage to charge said backup battery, and
        a backup mode of operation in which said backup power stage transfers power from said backup battery to said secondary winding via said backup power winding.

2. The power supply as recited in claim 1 wherein said transformer has a second secondary winding coupled to a DC power stage that provides a source of DC voltage.

3. The power supply as recited in claim 1 wherein said primary power stage comprises a primary switching network.

4. The power supply as recited in claim 1 wherein said backup power stage comprises a battery charger/inverter.

5. The power supply as recited in claim 2 wherein said DC power stage comprises a rectifier.

6. The power supply as recited in claim 2 wherein said DC power stage comprises a DC output switching network.

7. The power supply as recited in claim 1 wherein said AC power stage comprises an AC output switching network.

8. The power supply as recited in claim 1 wherein said AC power stage supplies an output frequency in a range of about 50 to 60 hertz.

9. The power supply as recited in claim 1 wherein said primary power stage comprises at least one input capacitor.

10. A method of operating a power supply, comprising:
    initiating a normal mode of operation in which a primary power stage of said power supply supplies power to a secondary winding of a transformer coupled to said primary power stage via a main power winding, having a first leakage inductance, of said transformer and further supplies power to a backup power winding, having a second leakage inductance, of said transformer to allow a backup power stage coupled to said backup power winding to charge a backup battery, one of said primary and backup power stages acting as a current fed source and including an inductor with an inductance greater than one of said first or second leakage inductances to which said current fed source is coupled, said secondary winding being coupled to an AC power stage; and
    entering a backup mode of operation in which said backup power stage transfers power from said backup battery to said secondary winding via said backup power winding.

11. The method as recited in claim 10 wherein said power supply supplies power to a second secondary winding of said transformer coupled to a DC power stage that provides a source of DC voltage.

12. The method as recited in claim 11 wherein said DC power stage comprises a rectifier.

13. The method as recited in claim 11 wherein said DC power stage comprises a DC output switching network.

14. The method as recited in claim 10 wherein said primary power stage comprises a primary switching network.

15. The method as recited in claim 10 wherein said backup power stage comprises a battery charger/inverter.

16. The method as recited in claim 10 wherein said AC power stage comprises an AC output switching network.

17. The method as recited in claim 10 wherein said AC power stage supplies an output frequency in a range of about 50 to 60 hertz.

18. The method as recited in claim 10 wherein said primary power stage comprises at least one input capacitor.

* * * * *